April 26, 1966  M. TELKES  3,248,464
METHOD AND APPARATUS FOR MAKING LARGE CELLED MATERIAL
Filed Aug. 22, 1962  6 Sheets-Sheet 1

FIG. 1   FIG. 2   FIG. 3

INVENTOR.
Maria Telkes
BY Pillars and Bowyer
ATTORNEY

INVENTOR.
Maria Telkes

April 26, 1966  M. TELKES  3,248,464
METHOD AND APPARATUS FOR MAKING LARGE CELLED MATERIAL
Filed Aug. 22, 1962  6 Sheets-Sheet 5

INVENTOR.
Maria Telkes
BY Pillars and Bowyer
ATTORNEY

April 26, 1966  M. TELKES  3,248,464
METHOD AND APPARATUS FOR MAKING LARGE CELLED MATERIAL
Filed Aug. 22, 1962  6 Sheets-Sheet 6

INVENTOR
Maria Telkes

BY
ATTORNEY

United States Patent Office 3,248,464
Patented Apr. 26, 1966

3,248,464
METHOD AND APPARATUS FOR MAKING LARGE CELLED MATERIAL
Maria Telkes, Allentown, Pa., assignor to The Dow Chemical Company, Midland, Mich., a corporation of Delaware
Filed Aug. 22, 1962, Ser. No. 218,667
19 Claims. (Cl. 264—96)

This application is a continuation-in-part of application Serial No. 3,181, for Large Celled Material, filed January 18, 1960.

This invention relates to method of making large celled material and particularly to improved methods for making panels of improved large celled substantially transparent materials and to equipment for making such panels.

In the past, many different types of panels have been made of foamed material, many of which include the addition of skins or sheets around the sides of the foamed material, either bonded thereto or simply as boundary layers for the foam core. In most instances the foam comprises material having voids dispersed throughout the material in a substantially uniform manner and surrounded by the bulk of the material. Where such foam is used for panel structures, it normally is formed of material which solidifies into a substantially rigid mass which can be molded prior to its solidification into the desired shape or can be trimmed or cut after it has solidified to provide the desired finished panel.

Nucleated or very small celled polystyrene or similar foam often is used in making rigid panel structures. Such foam has the disadvantage of being substantially opaque unless very thin layers are used and therefore does not transmit any substantial amount of light or any substantial amount of short wave infrared radiation. It has the advantage of being a fairly good insulating material. For many uses, it is desirable to have relatively light-weight light-transmitting and short wave infrared radiation transmitting panels, which also are good long wave heat insulators.

According to the present invention, panels are formed of substantially transparent material which is bubbled or otherwise formed into relatively large substantially uniform volume cells. These are assembled and compressed together to the desired thickness of the panel, thus providing a conglomerate of interlocking polyhedral cells having united outer surfaces or common walls.

It has been found that heat loss through cellular material increases very rapidly as the size of a cell decreases below a quarter inch minimum distance between cell walls and particularly for cells having less than one-eighth inch between cell walls. This may be due to the fact that for such distances there is a substantial amount of solid material in the small celled material as compared to the solid material in the larger size celled material. The heat loss has been found to diminish very materially with increase in distance between cell walls up to a maximum of about one inch, there being, however, very little appreciable gain where the distance between cell walls increases above three-quarters of an inch, and the best results appear to be in cells having walls of about half-inch spacing. A reason why cells having a wall spacing greater than about three-quarters of an inch do not appreciably increase the heat insulating capacity of the material and, in fact, over one inch decrease its insulating capacity, probably is due to the existence of convection currents in the gas or air within the cells, which aid in transmitting heat through the material. It is desirable, therefore, to have the cell shape and size such that the distance between cell walls preferably is between one-fourth and three-fourths inch. It has been found that a half-inch wall spacing for large celled material provides a very good light and short wave infrared radiation transmitting material having excellent long wave heat insulating properties. Such material has been found to transmit about 70 percent of the light and infrared radiation incident on the surface of a panel made of the material, as it allows the relatively short infrared waves to pass, and it is a good insulating material as it minimizes the retransmittal of the longer wave lengths, including the long wave infrared radiations, and the cells are sufficiently small substantially to prevent setting up convection currents within the cells. For some uses, as where a colored window is desired, a suitable dye or coloring material may be added to the cell producing material or colored skins or sheets may be used.

It is an object of this invention to provide improved methods of making large celled members of substantially transparent material.

A further object of this invention is to provide improved apparatus for forming large celled rigid panels of substantially transparent material having good light and short wave infrared transmitting properties and having good long wave heat insulating properties.

Further objects and advantages of this invention will become apparent from the following description referring to the accompanying drawings, and the features of novelty which characterize this invention will be pointed out with particularity in the claims appended to and forming a part of this specification.

Figure 1:
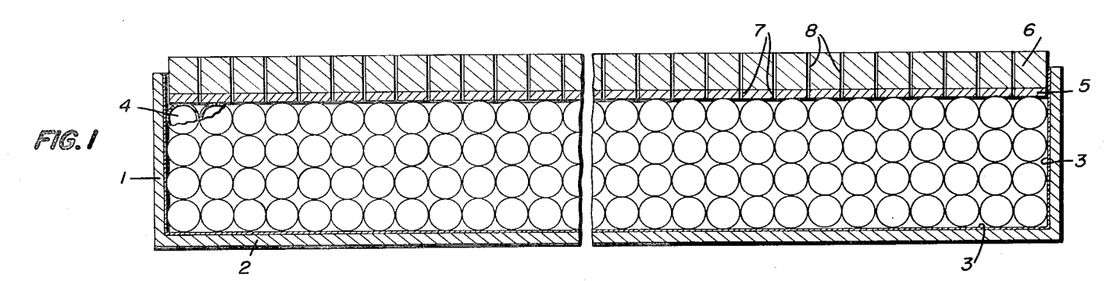
FIG. 1 is a longitudinal sectional view, partly broken away, through a mold illustrating a multiple layer of rigid thin-walled beads, prior to being compacted and fused together to form an improved multicellular panel.
Figure 2:
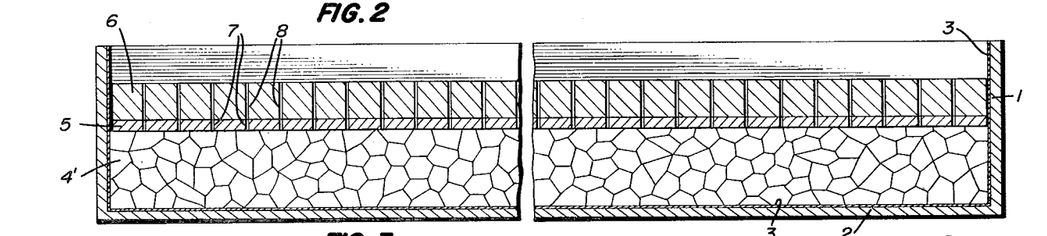
FIG. 2 is a longitudinal sectional view, partly broken away, through a mold similar to that shown in FIG. 1, illustrating the arrangement of the compacted interlocking conglomerate of polyhedral cells formed from an assembly, such as that of FIG. 1, after having been suitably heat treated and compressed.

Referring to the drawings, FIGS. 1 and 2 illustrate equipment for making an improved solar energy transmitting and heat insulating panel structure in accordance with this invention wherein individually preformed substantially spherical hollow rigid beads are assembled in a mold, as shown in FIG. 1. These assembled beads then are heat treated and compacted to form the finished cellular panel comprising an interlocking conglomerate of polyhedral cells having fused outer wall surfaces or common walls for adjacent cells.

An important result of practicing this invention is that the material of which the cell walls are made is substantially transparent and has the characteristic of transmitting a large percentage of solar energy, especially light and short wave infrared radiations, while absorbing long wave infrared radiations and otherwise minimizing the transmittal of heat through the panel by convection or conduction. Thin films formed of materials having a low index of refraction are especially good for a high degree of solar energy transmission. This is due in large measure to the low reflection loss from the surfaces of such transparent films. A number of materials of this type are available in both organic and inorganic compounds, particularly those containing fluorine, although other substantially transparent materials also can be used if their index of refraction is sufficiently low and they are capable of being formed into sufficiently rigid stable thin films.

Solar energy transmission is influenced by the reflectivity of cell-forming materials, which in turn is a function of their index of refraction. Most glasses have a reflection loss at least 8% per pane or film. This is multiplied by the number of films or cell-walls. Materials with low index of refraction have lower reflectivities and therefore they transmit more solar radiation. Low index of refraction can be obtained in glasses, such as in fluoride glasses. Most glasses are opaque to long wavelength infrared, that is, they show the "greenhouse effect," transmitting solar radiation, but not transmitting heat re-radiation. In addition glasses or other transparent materials can be coated with very thin coatings to obtain low reflectivity.

Most plastics transmit solar radiation nearly to the same extent as glass, because the reflection losses are also nearly the same. Fluorinated plastics are exceptional, because their index of refraction is lower and therefore they transmit as much as 96% solar radiation per film, the balance of 4% is the reflection loss. Most plastics transmit certain bands in the infrared spectrum and some of them are quite transparent in the infrared. The latter include polystyrene, polyethylene, and some others. It is necessary to render these materials opaque to long infrared by mixing them with materials which absorb such long infrared wavelengths. At the same time, these materials should preferably have low index of refraction, to help diminishing reflection losses of solar wavelengths. According to this invention, certain inorganic fluorides have been found especially useful for attaining these results.

In practicing the present invention, the materials used preferably are thermoplastic and may include a variety of glasses or glass-like materials, as well as plastics, which may be formed into hollow thin-walled spherical beads. The material of which these beads are made preferably also is transparent, although, if desired, the material may be colored to provide a desired color to the finished panel or the beads may even be made of material which is translucent or opaque. The latter two types of materials would not, of course, have the light transmitting qualities of transparent material, but might well permit the transmission of a high percentage of short wave infrared radiation and could very effectively be used as panels forming light-weight curtain walls having excellent heat insulating properties.

The increased use of glass and similar material in building construction has made the problem of suitable heat insulation a very serious consideration for all such buildings. Glass and similar materials normally are poor heat insulators in thicknesses which are practical for building construction. Double windows in the form of storm windows or permanently sealed structures, having a dead-air space between two panes of glass, are relatively expensive and do not provide insulation comparable to a good insulated wall. Such double-paned structures seldom even provide the insulation obtainable by reasonably good uninsulated wooden frame house walls or 12-inch brick walls. Glass bricks have been used, but these also seldom have better insulating properties than double-paned glass windows with a half-inch dead-air spacing between panes. Multiple paned windows have been proposed and used, but the weight and cost of such window structures generally is quite excessive. In addition, sealing of the edges of the panes is very difficult and expensive, yet such sealing is a necessity in order to prevent a progressive accumulation of dust and dirt between the panes.

Experiments have shown that a spacing of more than a half-inch between multiple paned windows does not appreciably increase the insulating properties of such windows, and a spacing of more than an inch actually causes a decrease in the insulating properties of such windows. This decrease in the insulating properties probably is due in large part to convection currents which arise in the air between the panes due to the difference in temperature of the inner and outer panes and sufficient space to allow such currents. It has been found that the heat insulating property of an insulated wooden frame wall or 12-inch brick wall can be substantially duplicated by the use of eight thin glass or glass-like films or panes with a half-inch spacing between panes. Such a window would, of course, be entirely impractical because of its excessive weight and cost.

Substantially the same heat insulating and light and short wave infrared transmission properties are obtainable by the provision of a panel structure comprising an interlocking conglomerate of polyhedral cells of substantially transparent material wherein the walls of the cells are not uniform in size, shape, or angles. Such a finished panel includes a multiple layered assembly which provides for the transmission of light and short wave infrared radiation, while preventing a direct view through the panel. In addition, it minimizes the retransmission of heat because of an absorption of a large percentage of long wave heat radiation and because of a substantial elimination of convection currents within the panel and a long circuitous path through the solid material forming the walls of the cells, thereby minimizing direct conduction of heat through the panel. The cell walls also should be as thin as possible consistent with adequate strength to support normal pressures which might be encountered by a panel for the purposes desired without collapse of the panel.

A desirable thin-walled multiple layered polyhedron panel can be made by preforming substantially spherical thin-walled rigid hollow beads by any suitable method and assembling such hollow beads in a mold having the size and shape of the desired panel structure. Such a mold preferably is formed of material which does not readily react chemically with the material of which the beads are made and may comprise a stainless steel substantially rectangular body having side walls 1 and a bottom 2, as shown in FIGS. 1 and 2. The inner sides of the mold should be coated with any suitable inert material 3, such as lamp black, or other fine inert powder, which may be applied as a powder or as a wash, to prevent sticking of the beads to the mold. The mold then is filled with the desired number of layers of the rigid hollow beads 4, and these assembled beads then are covered with a suitable weighted plunger 5. It is desirable that the weight on the plunger should be uniformly distributed over its surface area which rests on the beads 4, and this can conveniently be done by simply adding a suitably heavy plate 6 over the plunger 5.

This multiple layered bead assembly then is placed in a heat treating oven so that the material of which the beads 4 are formed reaches a softening temperature, whereupon the weighted plunger 5 compresses the beads so that adjacent walls of the beads adhere to one another and generally fuse and interlock to form a compact conglomerate, as illustrated in FIG. 2. As shown in this figure, the beads lose their substantially uniform configuration and assume polyhedral shapes 4' having multiple sides generally uneven in dimension and direction. In cases where the beads comprise gelatin cells, the walls of the beads may be softened and made tacky by immersing the assembly, such as that shown in FIG. 1, in a four percent formaldehyde solution, after which the assembly may be inverted to allow excess formaldehyde solution to drain through cover passages 7 and 8 from between the beads 4. After the soaking and subsequent draining, the mold is again inverted, as shown in FIG. 1, whereupon the weighted cover plunger 5 compresses the beads as explained with reference to thermoplastic beads and shown in FIG. 2. The volume of the cells formed by the polyhedrons 4' generally is substantially uniform as most of the cells are formed by the original beads 4. In order to assure this characteristic in the finished panel, the plunger 5 and the plate 6 preferably are formed with a large number of spaced communicating passages 7 and 8, respectively, so that the air in the spaces between the beads 4 can escape while the beads are being compacted in the heat treating oven or otherwise. As is shown in FIG. 2, the finished panel structure is provided with substantially even, smooth, outer panel surfaces in engagement with the sides 1, the bottom 2, and the plunger 5, thus providing a panel having desirably finished surfaces on all sides and edges thereof. The number of layers of beads 4 originally assembled in the mold can be varied to provide the desired thickness and translucence to the panel. Where the beads or cells are made plastic and adhesive by immersion in a suitable solution, such as has been explained with reference to cells made of gelatinous material, the cellular assembly of FIG. 1 can be immersed in a container of a formaldehyde solution. After this immersion step, the cell container is removed from the plasticizer and superfluous material is drained from the cell containers through passages 8 and 9 in the cover plate 6 or through passages 16 in a container such as that shown in FIG. 3. In most instances, it is desirable that the compacted panel be cooled slowly in order to minimize the possible setting up of stresses in the cell walls.

As has been pointed out, a number of thermoplastic fluorides are suitable for making thin-walled rigid polyhedral cells which are practical for panel structures. An important feature of these materials is that they should have a relatively low index of refraction to visible light and preferably should be substantially transparent. The following materials have been found to be especially practical in the formation of panels in accordance with this invention: $AlF_3 \cdot 3NaF$, $CaF_2$, $MgF_2$, $KBF_4$, and $Na_2SiF_6$.

Calcium fluoride $CaF_2$, magnesium fluoride $MgF_2$ and sodium aluminum fluoride $AlF_3 3NaF$ are insoluble materials, available in the form of fine powders. They can be mixed with plastic materials or with water soluble film-forming materials, such as gelatin, methylcellulose, and the like, and formed into large celled panels.

Potassium fluoborate, $KBF_4$ and sodium fluosilicate, $Na_2SiF_6$ are water-soluble, or can be obtained in the form of fine powders. They can be mixed with water-soluble film-formers, such as gelatin, methylcellulose, and similar materials, and formed into large celled panels by "bubbling" air or gases of lower heat conductivity through them. The walls of the panels must be perforated to permit the evaporation of water, leaving the film-forming material and the solid fluoride incorporated into the cell-walls. $KBF_4$ and $Na_2SiF_6$ also can be mixed with water-insoluble plastic materials, as fine powders, while the material is heated and formed into large celled panels.

It is common practice to add "fillers" to plastic materials to impart to them some desirable properties, such as increased resistance to flammability or simply to decrease the price. The fluorides mentioned above can be regarded as "fillers" added for the dual purpose to stop long infrared re-radiation and to decrease reflectivity. They can also be considered as additives in the same dual sense, because the usual amount is only 5 to 20% of the total dry-weight of the material forming the panel.

The thermal insulating properties of the panels can also be improved by the use of gases other than air within the hollow preformed beads. One such gas which is especially practical is carbon dioxide, as its heat conductivity is only slightly more than one-half that of air and this gas is not noxious to human beings.

The reflection of radiations from the wall surfaces of the polyhedral structures also can be reduced by applying a low reflection coating to these surfaces. A very convenient method of accomplishing this is to add a small percentage of a fluoride to the gas used in making the hollow beads. Only a very small amount of the fluoride is needed because only a very thin layer or coating is necessary to produce the low reflecting surface. Thus, a very small amount of hydrofluoric acid or similar agent added to the gas can form a substantially invisibly thin low-reflection coating or etched inside surface of each of the hollow beads and further decrease the index of refraction of the finished panel.

In certain instances, it may be desirable to provide panels having very smooth even surfaces. This can best be obtained by facing each side of the cellular panel with a relatively thin sheet or skin of even smooth material, such as a thin layer or plate of glass or plastic. Such a structure forms a cored laminate which can be made substantially transparent to light and short wave infrared radiations, with very good thermoinsulating properties which minimize the heat loss through the panel. Such a cored laminate also can be used to provide very pleasing esthetic effects by using colored transparent material to form the conglomerate of polyhedral cells comprising the core of the panel and using substantially transparent skins on one or both sides of the panel, or one or both skins can be made of colored material with substantially clear core material. Such colored panels can be used to produce the effect of stained glass windows and can also be used where colored lighting effects are desired.

Figure 3:
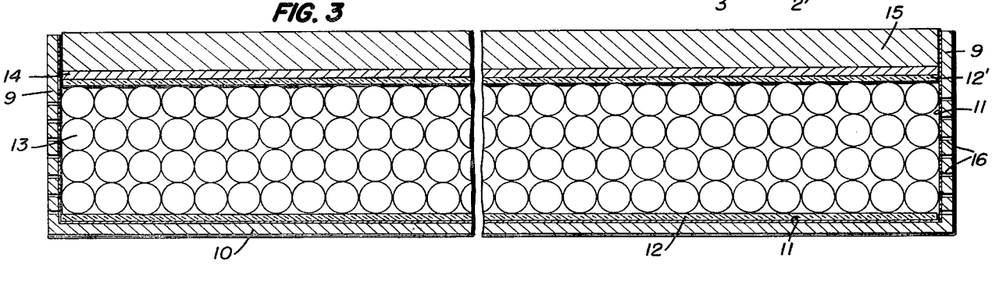
FIG. 3 is a longitudinal sectional view, partly broken away, through a mold similar to that shown in FIGS. 1 and 2, illustrating the arrangement of a multiple layer of rigid thin-walled hollow beads between a skin or thin sheet arranged on each side of the assembly.
Figures 4, 5:
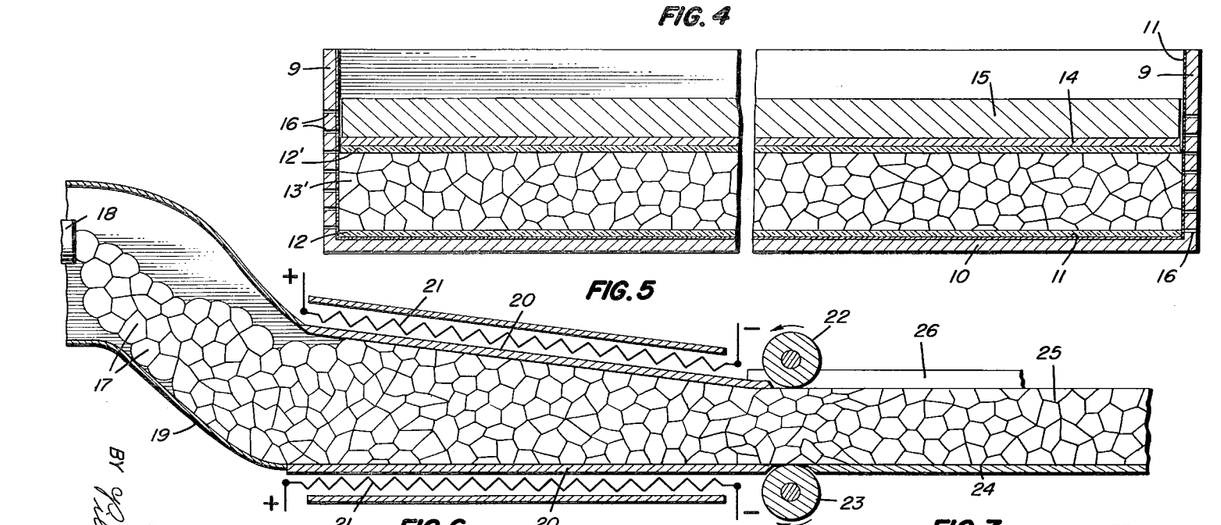
FIG. 4 is a longitudinal sectional view, partly broken away, through a mold of the type shown in FIG. 3, illustrating the compacted interlocking conglomerate of polyhedral cells between a skin or thin sheet on each side of the assembly after having been heat treated and compressed to the finished panel size.
FIG. 5 schematically illustrates a longitudinal sectional view through an apparatus for continuously producing a multilayer interlocking conglomerate of rigid thin-walled hollow polyhedral cells in the form of a panel by a system which blows or otherwise suitably forms the cells and continuously feeds the bubbled cells to thermal treating and compressing equipment, which forms the loosely arranged assembly of cells or bubbles into a finished compacted panel of predetermined thickness and width.

FIGS. 3 and 4 illustrate apparatus for forming cored laminates of this type having a relatively thin sheet or skin on each side of a cellular filler made from preformed rigid thin-walled hollow beads. In this apparatus, a mold is provided comprising a receptacle having sides 9 and a substantially even smooth bottom 10. As in the arrangement described with reference to FIG. 1, the sides and bottom of the mold preferably are coated with lampblack 11 or any other suitable inert material to prevent sticking of the material of which the panel is made to the sides and bottom of the mold.

In this arrangement, a thin sheet or skin 12 of suitable substantially transparent material, such as glass, is placed over the bottom 10 of the mold. A multiple layer of rigid thin-walled hollow beads 13 then are placed over the sheet 12 to provide the desired finished thickness of the laminate. Where it is desired to have a very even smooth surface on both sides of the laminate, a thin sheet or skin 12' also is placed over the upper layer of beads 13 and the assembly is covered by a plunger 14 loosely slidably fitted in the top of the mold. The plunger 14 is adapted to compress the hollow beads to the desired panel thickness, and, in order to assure a uniform thickness to the panel, it is desirable that pressure by the panel upon the material in the mold should be distributed substantially uniformly over the surface of the upper skin 12'. This can conveniently be provided for by placing a suitably heavy plate 15 over the plunger 14, which will weight the plunger substantially uniformly. This heavy plate 15 also should have a small working clearance with the sides 9 of the mold to allow for free movement of the plunger and plate within the mold.

In order to form the assembly of thin walled hollow beads and skins into an interlocking conglomerate of polyhedral cells having sides of unequal dimensions extending at various angles, the assembly in the mold is placed in a heat treating oven so that the material of which the beads 13 and the skins 12 and 12' are formed will be softened, whereupon the weighted plunger 14 compresses the beads 13. As the softened beads 13 are compressed, adjacent walls of the beads adhere to one another and generally fuse and interlock to form a compact cellular conglomerate core which also is adhered to the inner sides of the skins 12 and 12' by fusion therewith. This arrangement is best illustrated in FIG. 4. Since most of the polyhedral cells will be formed by the substantially uniform beads 13, the volume of most of the resulting polyhedral cells 13' will be substantially equal. With this arrangement, the upper skin 12' is imperforate, so air in the spaces between the cells 13, FIG. 3, cannot escape through the plunger 14 and plate 15, and, unless such air is evacuated or allowed to escape from between the skins 12 and 12', very little compression of the core material can result. In order to facilitate the removal of the air from between the hollow beads 13 during the compressing of these beads in the heat treating oven, the sides 9 of the mold preferably are formed with a plurality of vents 16, through which air can escape from within the mold. With this arrangement it is particularly desirable that the compacted panel be cooled slowly in order to avoid setting up stresses in the walls of the polyhedral cells 13' and the skins 12 and 12', and to maintain a completely cohered assembly.

As in the arrangement described with reference to FIGS. 1 and 2, the number of layers of hollow beads 13 can be varied to obtain the desired thickness and translucence of the finished cored laminate or panel. The various features described with reference to FIGS. 1 and 2 regarding the materials which may be used for forming a cellular panel of an interlocking conglomerate of polyhedral cells to provide various characteristics thereto are equally applicable to cellular panels made with the apparatus shown in FIGS. 3 and 4.

In accordance with another embodiment of this invention, a fully fused interlocking conglomerate panel of polyhedral cells can be made by a continuous process in which the cells are formed and continuously fed to heat treating and compacting apparatus. FIG. 5 schematically illustrates this type of apparatus.

In a continuous process such as that illustrated in FIG. 5, thin-walled hollow polyhedrons or bubbles 17 may be formed in any suitable manner, as by being blown from orifices of a suitable bubbling device 18. The bubbles 17 are conveniently conducted directly from the orifices of the bubbler 18 through a supply chamber or nozzle 19 into a heat treating and compacting chamber. This chamber preferably is formed with converging walls 20 which are heated in any suitable manner, as by electric heating elements 21.

With such an arrangement it is necessary that the material of which the bubbles 17 are made be in a fluid or plastic condition in the bubbler, so that the bubbles can readily be blown by air or any other suitable gas, and the conglomerate of bubbles 17 can then flow freely through the supply nozzle 18 into the heat treating chamber. The heating elements 21 are preferably arranged so that the temperature of the heat treating chamber or oven is hottest at the end of the chamber to which the bubbles 17 are supplied and progressively decreases toward the opposite end of the chamber, so that the material of which the bubbles are formed tends to solidify and the bubbles take the shape of substantially rigid thin-walled cells as they progress through the chamber. Adjacent cells in such a structure have common walls, so that there is no problem presented in this process to assure a thorough adhesion of all of the cells into a fully interlocked cohesive mass. It is desirable, however, to provide for the gradual decrease in temperature in the heat treating chamber from the supply end to the exhaust end in order gradually to solidify the material as it passes through the chamber so as to avoid setting up stresses in the walls of the cells.

In order to assure a uniform thickness to panels made with this type of apparatus, a pair of rolls 22 and 23 is arranged closely adjacent to and respectively above and below the exhaust end of the heat treating chamber, so as to compact the cellular conglomerate as it passes from the heat treating chamber. Rotation of the rolls as shown in FIG. 5 also provides for continuously drawing the cellular conglomerate out of the heat treating chamber and continuously driving it on to a receiving table 24 from which it can be cut into any desired lengths.

The bubbler equipment 18, delivery nozzle 19, and heat treating chamber all are formed with suitable side walls to provide a finished cellular panel 25 having a desired uniform width. Since the material of which the cells of the panel 25 are formed has solidified by the time it reaches the receiving table 24, it is not necessary to provide continuous walls for the entire length of the table 24; however, it is desirable to have at least short guide walls 26 on the sides of the receiving table 24 adjacent to the compacting rolls 22 and 23 in order to assure properly feeding the panel 25 lengthwise on to the receiving table 24.

The material for forming the thin-walled polyhedral cells 17 may comprise any suitable glass or glass-like material which can be plasticized by heat in the bubbler which forms the cells, and may even comprise other suitable rigid cell forming materials, such as gelatine. It has been found that very good large celled panels may be formed from material comprising a composition of a polymer of trifluorochloroethylene. Other good materials may comprise a composition of 6 to 12 percent gelatine, 0.05 to 0.2 percent foaming agent, a strengthening additive, 3 to 5 percent of a 37 percent solution of formaldehyde, 0 to 20 percent of a 2 percent water solution of methylated cellulose, and the remainder water. The foaming agent in such a material may comprise various agents, such as a petroleum sulfonate, various water soluble soaps, such as metallic stearates or metallic sulfonates, sodium alkyl aryl sulfonate, and dioctyl sodium sulfosuccinate dissolved in water. In some instances, it also may be found desirable to add to the gelatinous material of which the cells are to be formed, up to 10 percent of a 10 percent solution of diethanol amine derivatives. Another additive which has been found to be particularly useful in increasing the strength of the cell walls is octakis (2-hydroxy propyl) sucrose. Another type of additive which has been found to be useful in strengthening a gelatine type material is methylcellulose. Up to 5 percent of polyvinyl alcohol also can be used as an additive to increase the strength of the cell walls and has been found particularly good where the panel is to be used for outdoor exposure. Certain types of glycerine in small percentages up to 5 percent have been found to give good results by increasing the stickiness of the bubble material.

In some instances, it may be found desirable to add to the cell making material fillers which are relatively cheap and extend the volume of the material without diminishing its desirable properties. Such filler materials should be in the form of very fine powder so that they will not interfere with the formation of the thin walls of which the bubbles or cells are made. This fine powder may comprise up to 4 percent of an aluminum powder, which normally is in the form of minutely fine flakes. It also may comprise up to 20 percent of very finely powdered calcium carbonate.

Various thermoplastic materials may be found to be suitably fluid for the formation of bubbles without the addition of solvents or foaming agents and where such is the case, the thermoplastic material need only be heated to the desired temperatures to maintain its fluidity until the bubbled material or foam is delivered to the forming apparatus, which may comprise the heat treating chamber and rolls of apparatus, such as that shown in FIG. 5, or may comprise suitable molds, such as those shown in FIGS. 1 through 4. All of the various modifications for providing specific characteristics to the finished cellular panels, as described with reference to the apparatus shown in FIGS. 1 through 4, can also be utilized in making the cellular panels using the equipment schematically illustrated in FIG. 5.

Figure 6:
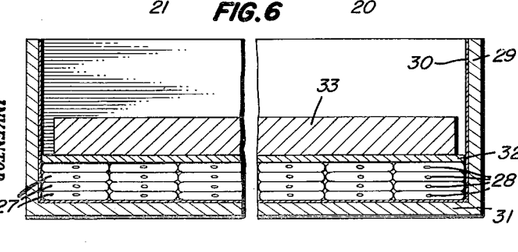
FIG. 6 is a transverse sectional view, partly broken away, through a mold similar to that shown in FIG. 1, wherein a multiple layer of relatively small tubular hollow needle type cells are assembled with a small amount of gas-liberating material in each cell.

In accordance with another embodiment of the present invention, large celled thin-walled interlocking polyhedrons may be made from relatively small tubular or hollow needle elements or beads 27 of thermoplastic transparent material by inserting into each bead a small amount of material 28 capable of liberating gas on being heated, such as ammonium carbonate or ammonium chloride. The beads are sealed after the gas liberating material has been inserted therein, and a multiple layer of these hollow bead elements are assembled in a suitable mold 29 to any desired thickness, as shown in FIG. 6. As in the arrangements described with reference to FIGS. 1 to 4, the inner surfaces of the mold 29 preferably are coated with an inert material 30, such as lampblack, to prevent sticking of the bead elements to the sides of the mold.

As in the arrangement shown in FIGS. 1 through 4, the hollow elements 27 may be placed in the mold directly in contact with the bottom 31 of the mold, or a thin skin or sheet of transparent, even, smooth material may first be placed over the bottom of the mold, as in the arrangement illustrated in FIGS. 3 and 4. A suitable plunger 32 is arranged over the assembly of hollow bead elements 27, and a heavy plate 33 is placed over the plunger 32 so as to distribute the weight of the plate 33 evenly over the plunger and provide an evenly distributed compressive force over all of the assembled elements 27. The plunger 32 and the plate 33 are of a size to provide a free sliding clearance with the inner sides of the mold 29.

Figure 7:
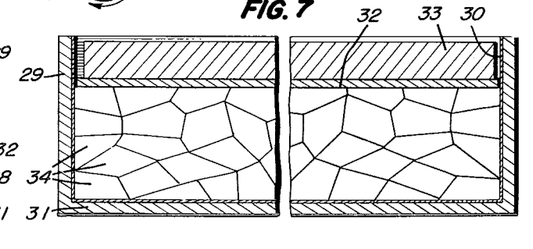
FIG. 7 is a transverse sectional view, partly broken away, through the mold shown in FIG. 6, illustrating the cellular panel after having been suitably heat treated so that the gas-liberating material has reacted and expanded the cells into an interlocking conglomerate of thin-walled hollow polyhedrons.

This assembly of elements in the mold 29 then is placed in a suitable heat treating oven, and the temperature of the assembly is raised so that the gas liberating material 28 will decompose and liberate gas which will expand the hollow elements 27 into thin-walled polyhedrons 34, as shown in FIG. 7. This heat treatment is continued until the walls of the cells have thoroughly united or fused to form a completely interlocking conglomerate of polyhedral cells with cell walls of various sizes extending in many different directions. This forms a cellular panel having a much larger volume than the original assembly, as can be seen by comparison of FIGS. 6 and 7, and forms a finished large celled panel having substantially even smooth outer panel surfaces. The various treatments and modifications as explained with reference to the preceding embodiments of this invention can also be incorporated in the manufacture of the large celled panels using the equipment of FIGS. 6 and 7 to provide the characteristics obtainable by such additions and modifications.

Figure 8:
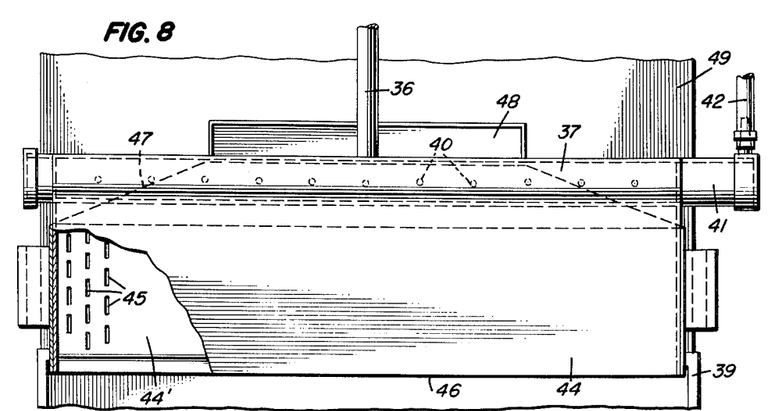
FIG. 8 is a plan view of apparatus, partly broken away, for forming an interlocking conglomerate of thin-walled hollow polyhedral cells or bubbles and assembling such cells in a suitable mold, similar to the molds shown in FIGS. 1 through 4.
Figure 9:
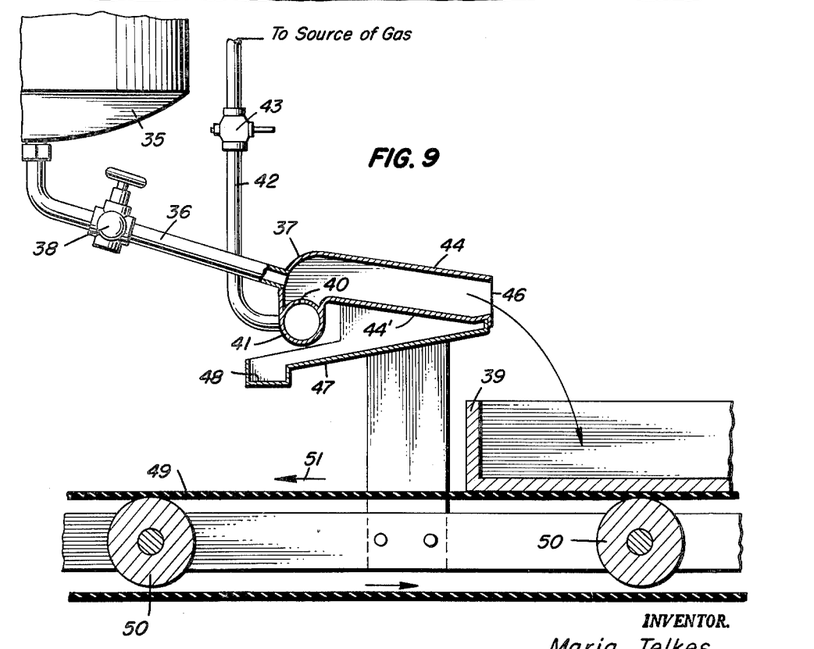
FIG. 9 is an elevational view, partly broken away and partly in section, of the apparatus shown in FIG. 8, illustrating the manner in which the cellular material can be evenly distributed in a suitable mold for a substantially continuous operation of the apparatus.

FIGS. 8 and 9 illustrate an improved type of bubbler which may be associated with a continuous process using equipment such as that shown in FIG. 5, or for making a bubbled conglomerate which can be assembled in molds of the type shown in FIGS. 1 through 4. In the illustrated arrangement, the bubble forming material is prepared or collected in a suitable chamber or reservoir 35 from which it is supplied through a conduit 36 to a material receiving chamber 37 of an improved type of bubbler. A suitable valve 38 is provided between the reservoir 35 and the material receiving chamber 37 so as to regulate the flow of material into the receiving chamber, whereby the amount of material in this chamber can be kept at a predetermined level.

As is more clearly shown in FIG. 8, the material receiving chamber 37 extends transversely of the equipment to a width corresponding to the desired width of a finished panel, that is, substantially equal to the width of a bubble receiving mold 39. Bubbles of a desired size having a desired thickness of wall material are adapted to be blown by passing air or a suitable gas through a plurality of orifices 40 spaced transversely along the length of a transversely extending blowing tube 41, which is arranged in the lower portion of the material receiving chamber 37. The gas for blowing the bubbles is supplied to the blowing tube 41 from any suitable source through a conduit 42.

It has been found that the size of the bubbles and the thickness of the material forming the walls of the bubbles can be regulated to predetermined values by controlling the depth of the material in the bubbler above the orifices 40, by making the orifices 40 of a predetermined size, and by regulating the pressure of the gas used in blowing the bubbles. A suitable valve 43 is arranged in the conduit 42 so as to regulate the pressure of the gas supplied to the blowing tube 41. It also has been found that the size of the bubbles vary with the density of the liquid from which the bubbles are made and the surface tension of the liquid. The size of the bubbles also depends upon whether the material forming the bubbles is of a type which wets the blowing orifice material and whether the orifices are vertical or extend at an angle. By careful control of all of these various factors, it is possible to obtain the most desirable size of bubbles, which, as has been previously stated, preferably is a bubble having a diameter of from one-quarter to three-quarters inch, and most preferably one-half inch in diameter.

In some instances, the material used in making the bubbles will carry a certain amount of surplus unbubbled liquid with the bubbles as they pass away from the bubbling orifices 40. It is desirable that this unbubbled material should be drained from the interlocking cellular conglomerate formed by the bubbles before they are assembled for heat treatment and compression into finished panels. A bubble gathering transversely extending nozzle 44 is provided, which extends away from the material receiving chamber adjacent to the bubbling tube 41. The lower side 44' of the nozzle 44 is perforated with a plurality of transversely and longitudinally spaced drainage slots 45 through which the surplus unbubbled material can be drained from the bubbled conglomerate as it passes from the chamber 37 to the outlet end 46 of the nozzle 44. Surplus material which is drained through the slots 45 is gathered by a suitable drainboard 47 and conducted to a sump 48, from which is can be suitably disposed by return to the reservoir 35, or in any other desired manner.

In the illustrated arrangement, the molds 39 preferably are supported on a traveling conveyor belt 49 supported on rollers 50. By controlling the speed of the conveyor belt 49 and moving it in a direction as indicated by arrow 51, FIG. 9, the depth of bubbled material delivered to each mold 39 can be evenly regulated. Each mold 39, which has been filled to the desired depth, can be transferred by the conveyor belt 49 away from the bubbling equipment, so that a weighted plunger can be put over the bubbles collected in the mold 39, after which the entire assembly can be transferred to a suitable heat treating oven for completion of the process as has been described with reference to the apparatus shown in FIGS. 1 through 4. If desired, suitable thin sheets or skins may be placed on one or both sides of the interlocking cellular conglomerate in the molds 39, in a manner similar to that described with reference to FIGS. 3 and 4.

Figure 10:
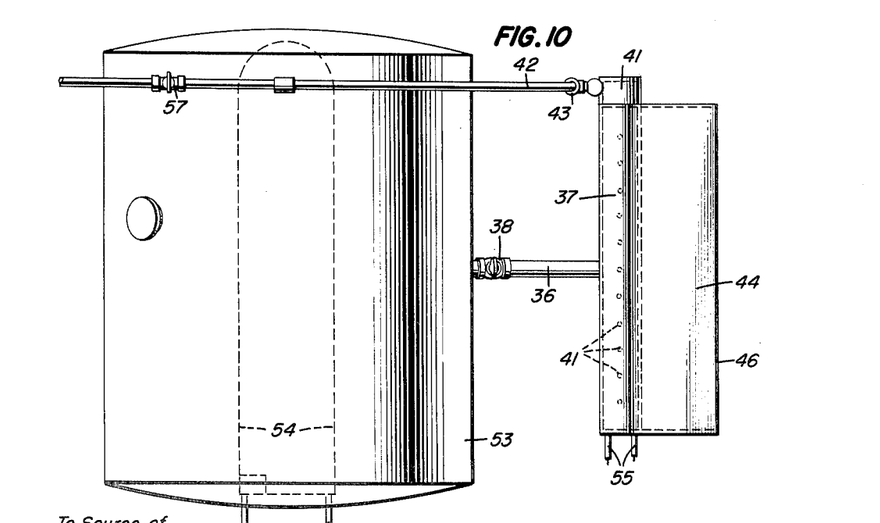
FIG. 10 is a plan view of a modified type of apparatus, similar to that shown in FIGS. 8 and 9, for forming a desired type of thin-walled cellular material by a bubbling process especially adapted for use where the material is thermoplastic and requires heating in order to maintain a desired fluidity in both the supply chamber and the cell forming bubbler chamber.
Figure 11:
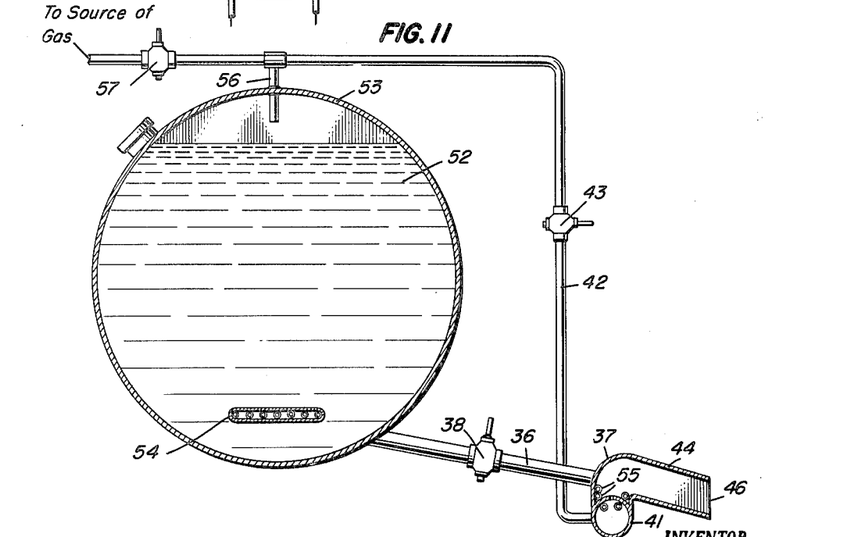
FIG. 11 is an elevational view, partly in section, illustrating the apparatus shown in FIG. 10, for forming large thin-walled cells with a heated bubbler.

For certain types of thermoplastic material which are used in manufacturing cellular conglomerate for making large cell panels in accordance with the present invention, modifications of the apparatus shown in FIGS. 8 and 9 may be desirable in order to maintain the material at a bubble forming fluidity. Such modifications are illustrated in FIGS. 10 and 11, and include means for heating the material 52 in the preparing chamber or reservoir 53. Any suitable heater, such as a thermostatically controlled immersion heater 54, may be arranged to maintain the temperature of the material 52 at the desired value. Material from the reservoir 53 is adapted to be supplied to the material receiving chamber 37 of the bubbler through the conduit 36, and, as in the apparatus shown in FIG. 9, the level of the material in the chamber 37 can be maintained at a desired depth by controlling the flow through the conduit 36 by a suitable valve 38. In most instances, it will be found desirable also to provide the bubbler with a suitable heater, such as a thermostatically controlled immersion heater 55, arranged within and around the material receiving chamber 37 and the bubbler tube 41, so that the material from which the bubbles are being formed will be maintained at a temperature which will keep material in the bubbler at a desired fluidity to form bubbles of a predetermined desirable size.

The remainder of the apparatus shown in FIGS. 10 and 11 is essentially the same as that shown in FIGS. 8 and 9. If desired, the reservoir 53 also may be pressurized by connecting it to the source of gas pressure through a conduit 53, and a master valve 57 may be provided for regulating the pressure of the gas supplied from the source of gas pressure. When a bubbler of the type shown in FIGS. 8 and 9, or of the type shown in FIGS. 10 and 11, is used for forming bubbles of material, such as glass, which does not utilize a solvent, the lower side 41 of the nozzle 44 preferably is made imperforate and no drainboard 47 or sump 48 need be utilized.

Figure 12:
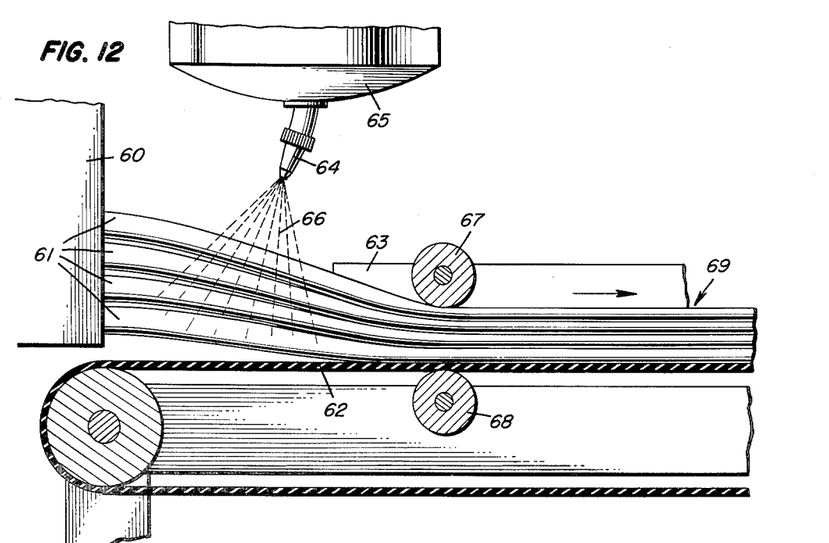
FIG. 12 is an elevational view, partly broken away and partly in section, illustrating apparatus for forming a multilayer interlocking conglomerate of polyhedral cells in the form of long hollow tubular members by a continuous process from an extrusion device to the finished compacted panel of desired depth and width.
Figure 13:
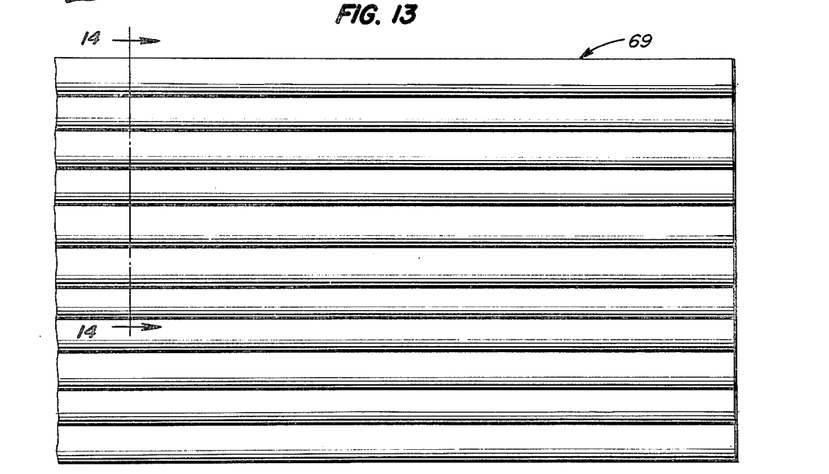
FIG. 13 is a plan view of an end portion of a panel made by the apparatus shown in FIG. 12.
Figure 14:
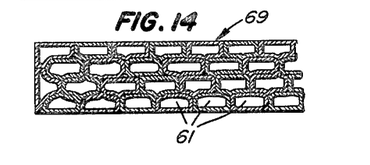
FIG. 14 is a sectional view, taken along line 14—14, of the tubular cell panel shown in FIG. 13.
Figure 15:
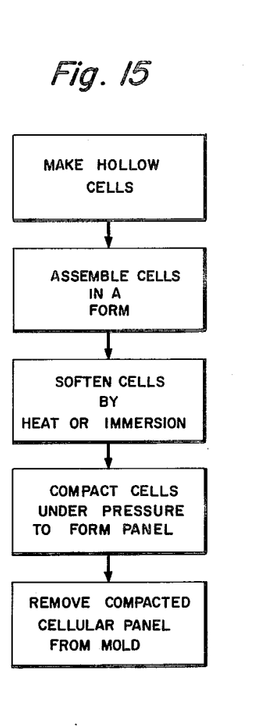
FIG. 15 illustrates by a flow diagram the generic steps of the present process of making large celled panels.
Figure 16:
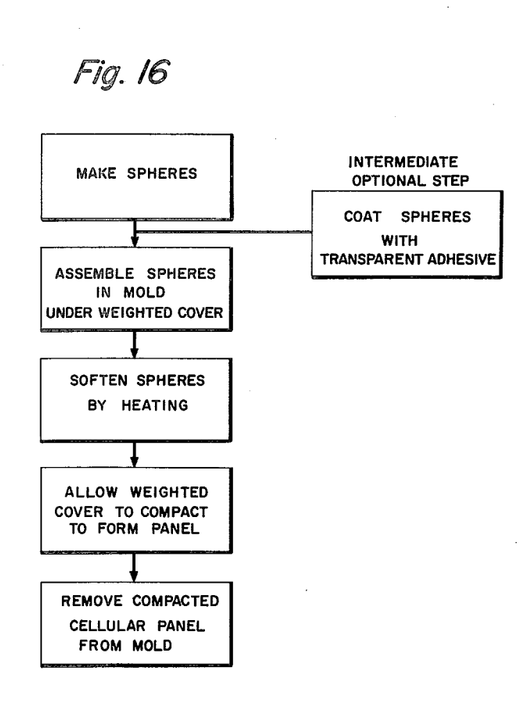
FIG. 16 is a flow diagram of the steps of the present process using thermoplastic material.
Figure 17:
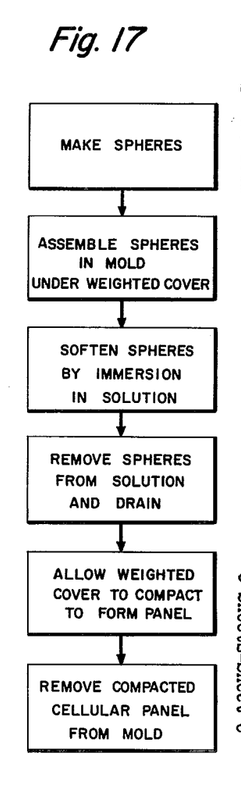
FIG. 17 is a flow diagram showing the steps of the present process using an immersion softening step.

Large thin-walled cells in the shape of hollow tubes also can be used to provide esthetically pleasing panels for the formation of curtain walls. Such tubular celled panels may be made in molds of the type illustrated in FIGS. 1 through 4, in which the large cells comprise inflated tubes which are sealed at both ends and extend substantially the full length of the molds. The manufacture of such curtain wall panels can be expedited by producing the panel material by a continuous process, which also has the advantage of providing for the manufacture of panels of any desired length. FIGS. 12, 13, and 14 illustrate apparatus for the continuous manufacture of such large celled tubular panel structures and sections of such panels.

As shown in FIG. 12, the apparatus for manufacturing tubular large celled panels may comprise any suitable extruding equipment 60 which is adapted to form a number of hollow tubes 61 transversely adjacent to one another and also to extrude a multiple layer depth of such transversely adjacent tubes 61. These tubes are sealed at the ends thereof immediately as they begin to pass from the extruding equipment 60, so that a suitable gas, such as air or carbon dioxide, may be blown into the hollow tubes 61 as they pass from the extrusion equipment.

A suitable traveling conveyor belt 62 is arranged under the extrusion equipment 60, so that the tubes 61 will automatically assemble on the belt 62 in the predetermined desired number of layers as formed by the extruding equipment, and sides 63 are arranged adjacent to the conveyor belt 62 to hold the extruded tubular cells in assembled relationship on the belt 62. Any suitable material of the type described with reference to the other apparatus for forming cellular panels may be used for the formation of the tubular cells 61.

In some instances, it will be found desirable to coat the outer surfaces of the tubes 61 with a thin coating of a transparent adhesive, such as waterglass. Such material can conveniently be sprayed upon the tubes 61 immediately as they pass from the extrusion equipment 60 by a suitable spray nozzle 64 which supplies the adhesive from a pressurized tank or reservoir 65. In this manner, a thin spray 66 of clear adhesive is applied over all the surfaces of the tubes 61 as they pass from the extrusion equipment to the belt 62.

A short distance from the place where the tubes are sprayed with the adhesive, the tubes are compressed into a compact adherent panel 69 by a pair of rolls 67 and 68. The pressure of the gas within the tubes 61 prevents the collapse of the tubes as they are compacted by the rolls 67 and 68 and provides for a good adherence of the surfaces of the tubes to one another into a conglomerated unit, as illustrated in the sectional view shown in FIG. 14. In this manner, the voids between the tubes are substantially eliminated and the walls of the tubes are united to provide a substantially uniform large celled polyhedral structure having substantially smooth outer panel surfaces. The various modifications which have been previously explained with reference to the other embodiments of this invention can also be utilized for obtaining the same characteristics in the tubular celled panels if desired.

While particular embodiments of this invention have been illustrated and described, modifications thereof will occur to those skilled in the art. It is to be understood, therefore, that this invention is not to be limited to the particular arrangements and structure disclosed, and it is intended in the appended claims to cover all modifications within the spirit and scope of this invention.

I claim:

1. The process of making cored laminates comprising forming hollow beads of a size between ¼ and ¾ inch between walls of the beads of a light transmitting material with adherent outer surface arranged in, a multiple layered assembly made by placing a plurality of layers of said beads between outer skins of light transmitting bondable material, and compressing the assembly to compact and adhere the beads together and to adhere the outer bead surfaces to said skins.

2. The process of making cored laminates comprising forming hollow members of a size between ¼ and ¾ inch between walls of the hollow members of transparent material, with adherent outer surfaces arranged in a layered assembly of said hollow members, and compressing the assembly to compact and unite the outer surfaces of said hollow members to each other.

3. The process of claim 2 wherein the transparent material is colored glass.

4. The process of making cored light transmitting laminates comprising blowing hollow tubular members of thermoplastic material, coating said tubular members with a thin coating of transparent adhesive, sealing open ends of the tubes, forming a layered assembly of said hollow tubular members between outer skins, plasticizing said tubular members and skins, and compressing the assembly while the tubular members are plastically deformable so as to compact the assembly and adhere the outer surfaces of said hollow inflated tubular members to each other and substantially eliminate voids between tubular members.

5. The process of making a light transmitting panel structure comprising forming hollow beads of a light transmitting plasticizable material, arranging said beads in a multiple layered assembly, plasticizing the assembled beads and making the outer surfaces thereof bondable, and compressing the assembly to compact and adhere the beads together and to form substantially even smooth outer panel surfaces.

6. The process of claim 5 wherein the beads comprise hollow gelatin cells having walls which are softened and the outer surfaces of which are made tacky by immersion of the assembly in a 4 percent formaldehyde solution which was drained prior to being compressed.

7. The process of making a light transmitting panel structure comprising the blowing with gas of hollow thin-walled bubbles of substantially transparent thermoplastic bondable material to a size of between ⅛ and 1 inch between walls of the bubbles, arranging said bubbles as interlocking conglomerated layers of multi-bubble depth, and plasticizing the bubbles by heating and compressing the layers of bubbles to compact the bubbles together into a panel of polyhedral cells with united common walls.

8. The process of claim 7 wherein the transparent material comprises a highly infrared transparent plastic mixed with a material selected from the group consisting of $CaF_2$, $MgF_2$, and $AlF_3 \cdot 3NaF$.

9. The process of claim 8 wherein the transparent material comprises a highly infrared transparent water soluble film-forming material mixed with a material selected from the group consisting of a polymer of trifluorochloroethylene, $Na_2SiF_6$, and $KBF_4$.

10. The process of claim 8 wherein the blowing gas is selected from the group consisting of a mixture of carbon dioxide and a small percent of hydrofluoric acid, an inert gas and a small percent of hydrofluoric acid, and carbon dioxide.

11. The process of making a light transmitting panel structure comprising the blowing with gas of hollow thin-walled bubbles of thermoplastic material to a size having walls thereof spaced ¼ to ¾ inch, arranging said bubbles as a layer of multi-bubble depth between skins of plasticizable material and heating and compressing the assembly of bubbles and skins to plasticize and compact the bubbles together into polyhedral cells and fuse them together with common walls and to fuse the skins to the beads.

12. The process of making cored laminates comprising forming hollow thin-walled rigid beads of transparent thermoplastic material with a small amount of a material selected from the group consisting of $AlF_3 \cdot 3NaF$, $CaF_2$, $MgF_2$, and $KBF_4$ in each bead, forming an assembly by placing said beads between outer skins of thermoplastic material, and plasticizing the beads and skins by heating and compressing the assembly to plasticize compact, and fuse the beads together and to fuse the outer bead surfaces to said skins while forming low-reflecting inner surfaces on the beads by said fluoride.

13. The method of making cellular panels comprising forming hollow beads of thermoplastic bondable transparent material, inserting into each hollow bead a small amount of material capable of liberating gas on being heated, arranging said beads into a multiple layered original assembly, heating said assembly under a compacting member so as to plasticize said hollow beads and to liberate gas from said inserted material to expand said hollow beads into a cellular mass of larger volume than said original assembly forming a cellular panel having united cellular surfaces with substantially even smooth outer panel surfaces.

14. The process of claim 13 wherein the gas liberating material is a material selected from the group consisting of ammonium chloride and ammonium carbonate.

15. Apparatus for making large celled material including a chamber for preparing the material, a bubbler, means for supplying material from said preparing chamber to said bubbler, said bubbler comprising a transversely extending material receiving chamber and a transversely extending blowing tube arranged in the lower portion of said material receiving chamber and formed with a plurality of transversely spaced orifices, means for supplying compressed gas to said blowing tube, means for controlling the pressure of gas supplied to said blowing tube for blowing bubbles of from ¼ to 1 inch between walls of the bubbles, means for gathering and distributing bubbles blown of material in said bubbler chamber by gas passing through the orifices in said blowing tube, means for receiving bubbled material from said bubbler and conveying away such material at a controlled rate to provide for a depth of conglomerated bubbles on said receiving means.

16. Apparatus for making large celled material including a chamber for preparing the material, a bubbler, means for supplying material from said preparing chamber to said bubbler, said bubbler comprising a transversely extending material receiving chamber and a transversely extending blowing tube arranged in the lower portion of said material receiving chamber and formed with a plurality of transversely spaced orifices, means for supplying compressed gas to said blowing tube, means for controlling the pressure of gas supplied to said blowing tube to form bubbles of a size between ⅛ and 1 inch between walls of the bubbles, means for gathering and distributing bubbles blown of material in said bubbler chamber by gas passing through the orifices in said blowing tube, said bubbler gathering means having a perforated lower side providing for the drainage of surplus material carried by said bubbles from said bubbler chamber, means for receiving material drained through said perforated side, and means for receiving bubbled material from said bubbler and conveying away such material at a controlled rate to provide for a depth of conglomerated bubbled material on said receiving means.

17. Apparatus for making large celled material including a chamber for preparing the material, a bubbler, means for pressurizing said preparing chamber, means for heating material in said preparing chamber, means for supplying material from said preparing chamber to said bubbler, said bubbler comprising a transversely extending material receiving chamber and a transversely extending blowing tube arranged in the lower portion of said material receiving chamber and formed with a plurality of transversely spaced orifices, means for supplying compressed gas to said blowing tube, means for controlling the pressure of gas supplied to said blowing tube to form bubbles of a size between ⅛ and 1 inch between walls of the bubbles, means for heating material in said bubbler chamber, means for gathering and distributing bubbles blown of material in said bubbler chamber by gas passing through the orifices in said blowing tube, and means for receiving bubbled material from said bubbler and conveying away such material at a rate to provide for a depth of conglomerated bubbled material on said receiving means.

18. Apparatus for making large celled material comprising a chamber for preparing the material, means for extruding the material in the form of hollow tubes from said chamber, said extruding means being constructed with a plurality of transversely and vertically spaced openings for extruding a number of hollow tubes transversely adjacent to one another and also to extrude a multiple layer depth of such transversely adjacent tubes, means for providing for sealing the outer ends of the tubes, said extruding means including means for blowing gas into the tubes, means for conveying the formed layers of tubes in assembled relationship away from said extruding means, means for cutting said tubes to a desired length, means for making the outer surfaces of said tubes adherent, and means for compressing the assembled layers of blown tubes so as to compact and adhere the outer surfaces of the tubes to each other and substantially to eliminate voids between the tubes without collapsing the blown tubes, said conveying means also being formed and arranged for conveying the compressed assembly of tubes away from said compressing means.

19. Apparatus for making large celled material comprising a chamber for preparing the material, means for extruding the material in the form of hollow tubes from said chamber, means for coating said tubes with a thin coating of substantially transparent adhesive, said extruding means being constructed with a plurality of transversely and vertically spaced openings for extruding a number of hollow tubes transversely adjacent to one another and also to extrude a multiple layer depth of such transversely adjacent tubes, means for sealing the outer ends of the tubes said extruding means including means for blowing gas into the tubes, means for conveying the formed layers of tubes in assembled relationship away from said extruding means, means comprising rollers for compressing the assembled layers of blown tubes so as to compact and adhere the outer surfaces of the tubes to each other into a conglomerated unit and substantially to eliminate voids between the tubes without collapsing the blown tubes, said conveying means also being formed and arranged for conveying the compressed conglomerated assembly of tubes away from said compressing means, and means for cutting the tubular assembly to panel length.

References Cited by the Examiner

UNITED STATES PATENTS

| | | | |
|---|---|---|---|
| 1,682,675 | 8/1928 | Horsfield. | |
| 2,067,312 | 1/1937 | Coryell | 65—20 |
| 2,363,051 | 11/1944 | Dosmann | 264—54 |
| 2,410,744 | 11/1946 | Powers | 161—139 XR |
| 2,593,714 | 4/1952 | Robinson | 161—139 XR |
| 2,779,062 | 1/1957 | Stastny | 264—55 |
| 2,797,201 | 6/1957 | Veatch et al. | 264—54 |
| 2,806,509 | 9/1957 | Bozzacco et al. | 264—331 |
| 2,996,419 | 8/1961 | Schmick | 161—139 |
| 3,066,059 | 11/1962 | Adie | 156—292 XR |
| 3,177,109 | 4/1965 | Zeigler | 264—41 XR |

FOREIGN PATENTS

| | | |
|---|---|---|
| 576,291 | 9/1959 | Belgium. |
| 677,419 | 1/1964 | Canada. |
| 464,629 | 6/1937 | Great Britain. |

ALEXANDER H. BRODMERKEL, *Primary Examiner.*

MORRIS LIEBMAN, *Examiner.*